3,334,092
DINITROPHENOTHIAZINE CARBOXYLIC ACIDS AND SALTS

John S. Driscoll, Lynnfield, Mass., assignor to Monsanto Research Corporation, St. Louis, Mo., a corporation of Delaware
No Drawing. Filed June 23, 1965, Ser. No. 466,421
15 Claims. (Cl. 260—243)

This invention relates to new compounds, and more particularly provides novel dinitrophenothiazine carboxylic acids and salts.

The presently provided compounds are of the formula

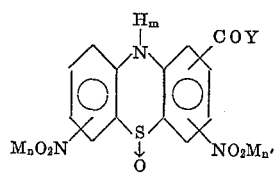

wherein

is a 6-membered hydrocarbon aromatic ring containing conjugated unsaturation, Y is a substituent selected from the class consisting of halogen, OH, OR and OX, where R is a saturated aliphatic hydrocarbon radical of 1–6 C atoms and X is a salt-forming radical, M is a metallic salt-forming radical, $m$, $n$ and $n'$ are integers of from 0 to 1, at least one of $n$ and $n'$ is 0, $m$ is 1 when both $n$ and $n'$ are 0, and $m$ is 0 when one of $n$ and $n'$ is 1. The halogen of the present compounds is of atomic weight below 80; the metallic salt-forming radicals are alkali metals of atomic weight below 40.

The presently provided novel compounds include sulfoxides (5-oxides) of dinitrophenothiazinecarboxylic acids, their carbonyl halides, their carboxylate alkyl esters, and salts and the aci-nitro salts.

The presently provided compounds are prepared by procedures as represented by the following equations, wherein M, X, R, $m$, $n$ and $n'$ are as defined above, and each R' is a substituent selected from the class consisting of hydrogen and hydrocarbon radicals of up to 10 carbon atoms.

(1) 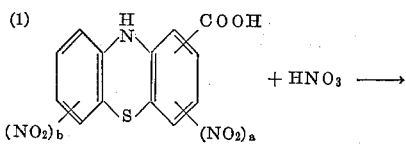 + HNO₃ ⟶

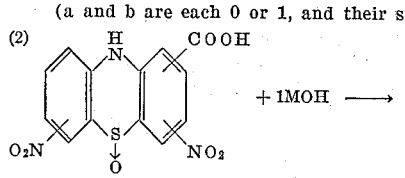

(a and b are each 0 or 1, and their sum is 0 or 1)

(2) 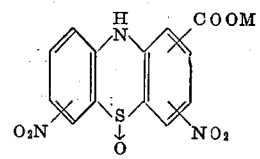 + 1MOH ⟶

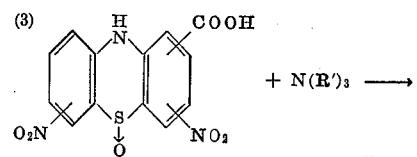

(3) 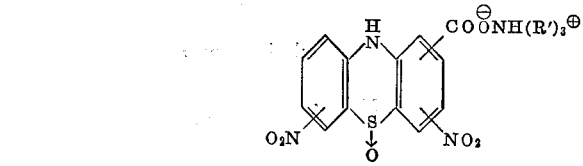 + N(R')₃ ⟶

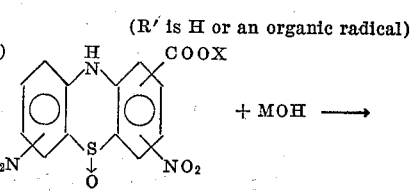

(R' is H or an organic radical)

(4) 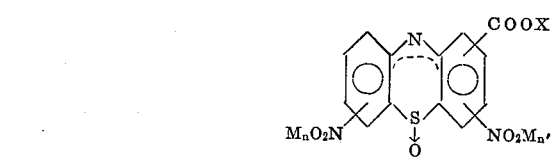 + MOH ⟶

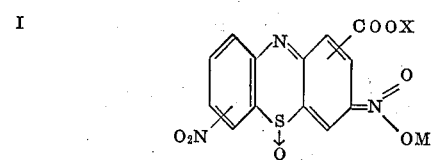

(one of $n$ and $n'$ is 1 and the other is 0)

wherein the product of Equation 4 contains bonds distributed in resonance formulas such as I 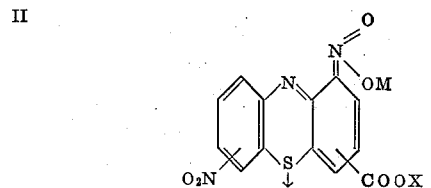

II 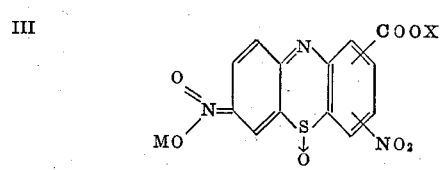

III 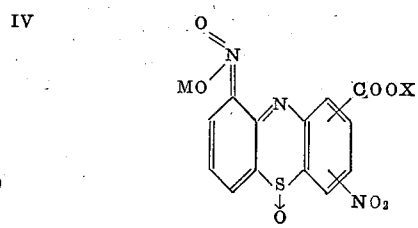

IV (5)

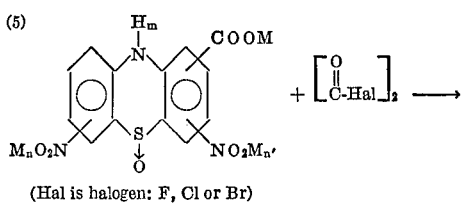

(Hal is halogen: F, Cl or Br)

(6)

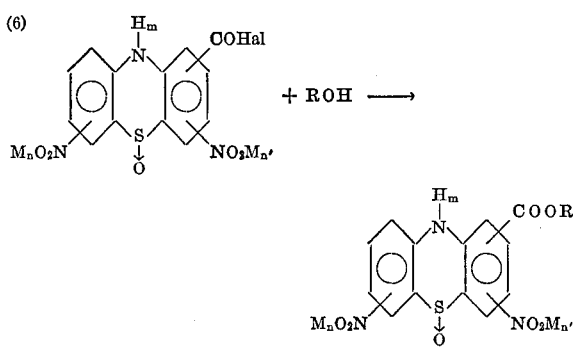

As will be appreciated from a consideration of the above resonance formulas, when the products of Equations 6 and 5 contain an aci-nitro group, the bonds will be appropriately distributed: for example, the product of Equation 5 may be

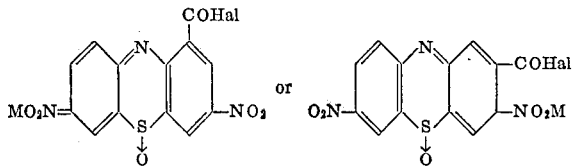

and so forth.

Thus, for example, dinitrophenothiazinecarboxylic acid sulfoxides provided by this invention include:

3,7-dinitrophenothiazine-1-carboxylic acid-5-oxide,
3,7-dinitrophenothiazine-4-carboxylic acid-5-oxide,
3,7-dinitrophenothiazine-2-carboxylic acid-5-oxide,
2,7-dinitrophenothiazine-3-carboxylic acid-5-oxide,
2,7-dinitrophenothiazine-1-carboxylic acid-5-oxide,
4,7-dinitrophenothiazine-2-carboxylic acid-5-oxide,
3,9-dinitrophenothiazine-1-carboxylic acid-5-oxide,
3,9-dinitrophenothiazine-2-carboxylic acid-5-oxide,
3,8-dinitrophenothiazine-1-carboxylic acid-1-oxide,
3,8-dinitrophenothiazine-4-carboxylic acid-1-oxide,
1,9-dinitrophenothiazine-2-carboxylic acid-5-oxide and the like.

The presently provided carboxylic acid salts include the alkali metal (sodium, potassium and lithium) salts of dinitrophenothiazine carboxylic acids such as those listed above, and further, the ammonium salts of the said acids such as their ammonium, diethylammonium, ethylammonium, dibutylammonium, butylammonium, benzyldiethylammonium, benzyldimethylammonium, benzyldipropylammonium, benzylethylmethylammonium, triethylammonium, tripropylammonium, trihexylammonium, diethylpropylammonium, tributylammonium, trioctylammonium, piperidinium, lutidinium, pyridinium, and cyclohexyldimethylammonium salts.

The presently provided aci-nitro salts are the products of Equation 4 wherein X is either an alkali metal selected from sodium, potassium and lithium, or an ammonium radical, which may have organic substituents, and M is an alkali metal selected from sodium, potassium and lithium. These include the sodium, potassium and lithium aci-nitro salts of the carboxylate salts of dinitrophenothiazine carboxylic acid 5-oxides such as those listed hereinabove, such as disodium 7-nitro-3-aci-nitro-3H-phenothiazine-1-carboxylate-5-oxide,
dipotassium 7-nitro-3-aci-nitro-3H-phenothiazine-1-carboxylate-5-oxide,
disodium 8-nitro-1-aci-nitro-1H-phenothiazine-3-carboxylate-5-oxide,
sodium triethylammonium 7-nitro-3-aci-nitro-3H-phenothiazine-1-carboxylate-5-oxide,
dilithium 1-nitro-7-aci-nitro-7H-phenothiazine-4-carboxylate-5-oxide,
sodium diethylammonium 7-nitro-3-aci-nitro-3H-phenothiazine-1-carboxylate-5-oxide,
potassium ammonium 3-nitro-7-aci-nitro-7H-phenothiazine-2-carboxylate-5-oxide,
sodium dibenzylethylammonium 7-nitro-9-aci-nitro-9H-phenothiazine-1-carboxylate-5-oxide,
potassium tributylammonium 7-nitro-3-aci-nitro-3H-phenothiazine-1-carboxylate-5-oxide,
sodium dimethyloctylammonium 8-nitro-3-aci-nitro-3H-phenothiazine-2-carboxylate-5-oxide,
sodium pyridinium 7-nitro-1-aci-nitro-1H-phenothiazine-2-carboxylate-5-oxide, and so forth.

The acid halides provided by this invention are illustrated, for example, by 3,7-dinitrophenothiazine-1-carbonyl chloride-5-oxide,
3,7-dinitrophenothiazine-1-carbonyl fluoride-5-oxide,
3,7-dinitrophenothiazine-2-carbonyl bromide-5-oxide,
3,7-dinitrophenothiazine-4-carbonyl chloride-5-oxide,
2,7-dinitrophenothiazine-3-carbonyl chloride-5-oxide,
2,7-dinitrophenothiazine-1-carbonyl fluoride-5-oxide,
4,7-dinitrophenothiazine-2-carbonyl chloride-5-oxide,
3,9-dinitrophenothiazine-1-carbonyl bromide-5-oxide,
3,9-dinitrophenothiazine-2-carbonyl chloride-5-oxide,
3,8-dinitrophenothiazine-1-carbonyl fluoride-5-oxide,
3,8-dinitrophenothiazine-4-carbonyl chloride-5-oxide,
1,9-dinitrophenothiazine-2-carbonyl chloride-5-oxide,
sodium 7-nitro-3-aci-nitro-3H-phenothiazine-1-carbonyl chloride-5-oxide,
sodium 7-nitro-3-aci-nitro-3H-phenothiazine-1-carbonyl fluoride-5-oxide,
potassium 3-nitro-7-aci-nitro-7H-phenothiazine-1-carbonyl chloride-5-oxide,
lithium 1-nitro-7-aci-nitro-7H-phenothiazine-4-carbonyl bromide-5-oxide,
sodium 7-nitro-3-aci-nitro-3H-phenothiazine-1-carbonyl fluoride5-oxide,
sodium 7-nitro-9-aci-nitro-9H-phenothiazine-1-carbonyl chloride-5-oxide,
potassium 7-nitro-3-aci-nitro-3H-phenothiazine-2-carbonyl fluoride-5-oxide,
sodium 7-nitro-1-aci-nitro-1H-phenothiazine-2-carbonyl chloride-5-oxide,
sodium 8-nitro-3-aci-nitro-3H-phenothiazine-2-carbonyl bromide-5-oxide, and the like.

The novel esters of dinitrophenothiazinecarboxylic acid 5-oxides provided hereby include, for example, methyl 3,7-dinitrophenothiazine-1-carboxylate-5-oxide,
ethyl 3,7-dinitrophenothiazine-1-carboxylate-5-oxide,
propyl 3,7-dinitrophenothiazine-2-carboxylate-5-oxide,
methyl 3,7-dinitrophenothiazine-4-carboxylate-5-oxide,
isobutyl 2,7-dinitrophenothiazine-3-carboxylate-5-oxide,
amyl 2,7-dinitrophenothiazine-1-carboxylate-5-oxide,
methyl 2,7dinitrophenothiazine-1-carboxylate-5-oxide,
hexyl 4,7-dinitrophenothiazine-2-carboxylate-5-oxide,
methyl 3,9-dinitrophenothiazine-1-carboxylate-5-oxide,
ethyl 3,9-dinitrophenothiazine-2-carboxylate-5-oxide,
isopropyl 3,8-dinitrophenothiazine-1-carboxylate-5-oxide, t-butyl 3,8-dinitrophenothiazine-4-carboxylate-5-oxide,
ethyl 1,9-dinitrophenothiazine-2-carboxylate-5-oxide,
methyl sodium 7-nitro-3-aci-nitro-3H-phenothiazine-
1-carboxylate-5-oxide,
ethyl sodium 3-nitro-7-aci-nitro-7H-phenothiazine-
1-carboxylate-5-oxide,
methyl potassium 8-nitro-1-aci-nitro-1H-phenothiazine-
1-carboxylate-5-oxide,
isopropyl sodium 1-nitro-7-aci-nitro-7H-phenothiazine-
4-carboxylate-5-oxide,
methyl lithium 7-nitro-9-aci-nitro-9H-phenothiazine-
1-carboxylate-5-oxide,
butyl sodium 7-nitro-3-aci-nitro-3H-phenothiazine-
2-carboxylate-5-oxide,
hexyl sodium 8-nitro-3-aci-nitro-3H-phenothiazine-
2-carboxylate-5-oxide,
methyl potassium 7-nitro-1-aci-nitro-1H-phenothiazine-
1-carboxylate-5-oxide,
ethyl sodium 8-nitro-1-aci-nitro-1H-phenothiazine-
1-carboxylate-5-oxide,
methyl lithium 3-nitro-7-aci-nitro-7H-phenothiazine-
1-carboxylate-5-oxide, and so forth.

In Equation 1 there is represented the reaction of a phenothiazine carboxylic acid to prepare a dinitrophenothiazinecarboxylic acid-5-oxide (sulfoxide). Employing an excess of the nitric acid, nitration of both of the aromatic rings of the phenothiazine compound is produced and also, the sulfur atom of the phenothiazine system is oxidized. Alternatively, an ar-nitrophenothiazinecarboxylic acid may be nitrated to produce the dinitrophenothiazinecarboxylic acid 5-oxide, as represented by the equation

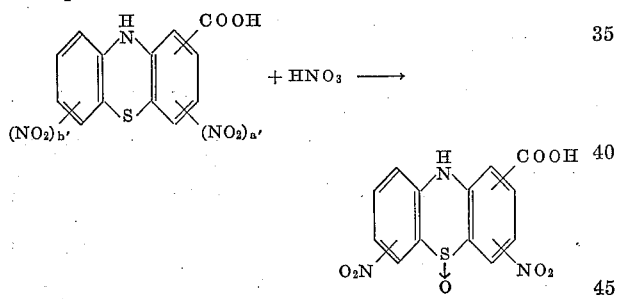

where $a'$ and $b'$ are each 0 or 1 and their sum is 1.

Reaction of the resulting dinitrophenothiazine carboxylic acid 5-oxide with one equivalent of an alkali metal hydroxide produces a metal carboxylate salt, as represented by Equation 2. Reaction with an amine (primary, secondary or tertiary) or ammonium hydroxide produces an ammonium salt of the acid as represented by Equation 3.

Reacting a dinitrophenothiazinecarboxylate - 5 - oxide salt with an equivalent of base, such base being an alkali metal hydroxide, wherein the alkali metal is sodium, potassium or lithium, produces the di-salt of an aci-nitro phenothiazine carboxylic acid, as represented by Equation 4.

Contacting an alkali metal salt of the dinitro- or nitroaci-nitrophenothiazinecarboxylic acid - 5 - oxide with an oxalyl halide produces the corresponding acid halide, as illustrated in Equation 5. Contacting the resulting acid halide 5-oxide with an alcohol provides a dinitro- or nitro-aci-nitrophenothiazinecarboxylate ester, as illustrated by Equation 6.

Starting materials for the presently provided products are well known to the art. For example, phenothiazinecarboxylic acids and nitro-substituted acids exemplifying presently useful starting materials and available as such or as esters which can be hydrolyzed to the acids, include phenothiazine - 1 - carboxylic acid, 3-nitrophenothiazine - 1 - carboxylic acid, 1 - nitrophenothiazine-3-carboxylic acid, phenothiazine-2-carboxylic acid, and so forth. For preparation of the nitrogenous salts of the present invention, the useful $N(R')_3$ compounds, where $R'$ is H or a hydrocarbon radical (free of aliphatic unsaturation) of up to 10 C atoms, are exemplified by ammonia, primary amines such as ethylamine, butylamine, benzylamine, and so forth; secondary amines such as diethylamine, N-ethylbutylamine, piperidine, and so forth; and tertiary amines such as triethylamine, benzyldimethylamine, pyridine, and the like. The alkali metal hydroxides useful for the present purposes include, for example, the hydroxides of sodium, potassium and lithium.

Conditions for conducting the nitration of the phenothiazinecarboxylic acid comprise contacting the phenothiazinecarboxylic acid (either an unsubstituted phenothiazinecarboxylic acid or a mono-nitrophenothiazinecarboxylic acid) with nitric acid, in a ratio of at least about 3 moles of acid per mole of the phenothiazinecarboxylic acid. A greater excess of the nitric acid may be employed, advantageously. The reaction of the nitric acid with the phenothiazinecarboxylic acid occurs rapidly, and it is usually desirable to moderate the reaction by cooling, and by gradual addition of the nitric acid to the phenothiazinecarboxylic acid. It is preferable to use a reaction medium which is relatively inert to the acid reactant and at least a partial solvent for the phenothiazine acid, such as glacial acetic acid, or the like, also, to aid in moderating the reaction. During addition of the nitric acid, temperatures such as from just above the freezing point of the reaction mixture up to room temperature are suitable. After completion of the addition, the reaction mixture may be maintained at more elevated temperatures, up to below the decomposition temperature of the reaction mixture components, until reaction is complete. In general, temperatures between 0° and 100° C. are suitable. During all stages of the nitration and S-oxidation reaction, atmospheric pressure is generally suitable, though subatmospheric pressures as low as 0.5 mm. Hg and superatmospheric pressures up to, say, 5000 p.s.i.g. may be used if desired.

The product is the dinitrophenothiazinecarboxylic acid 5-oxide, which may be recovered by usual methods such as filtration, precipitation, and the like.

To produce the dinitrophenothiazinecarboxylate-5-oxide salts, the acid is reacted with one equivalent (one mole per mole of acid) of a base, which may be an alkali metal hydroxide, or an amine (including ammonia or an amine having from one to three organic substituents). If an excess of the alkali metal hydroxide is employed, sufficient to provide two moles of the alkali metal hydroxide per mole of the carboxylic acid, or the carboxylate salt (alkali metal or ammonium) is contacted with a molar equivalent of an alkali metal hydroxide, the product is the di-salt of the aci-nitro substituted carboxylic acid.

Reaction of the carboxylic acid with base to produce the salts is conducted simply by mixing the acid with a solution of the base. The solvent may be water or an organic solvent for the base such as methanol, ethanol or the like. Removal of solvent leaves the desired salt; sometimes the mono- and di-salts are obtained in the form of a solvate such as a monohydrate.

To provide the acid halides of the present invention, an alkali metal salt of one of the presently provided novel acids is contacted with an oxalyl halide. The stated salt may be an alkali metal dinitrophenothiazinecarboxylate-5-oxide or a di-alkali metal-salt of a nitro-aci-nitrophenothiazinecarboxylate-5-oxide, as exemplified by the illustrative species listed hereinabove. The useful oxalyl halides include oxalyl fluoride, chloride and bromide. Reaction of the salt with the oxalyl halide generally occurs spontaneously on contact, as evidenced by evolution of gas from the reaction mixture. The ratio of the respective reactants may vary over a wide range, such as from 5:1 to 1:5 moles per mole, but to attain substantially complete conversion of the acid salt to the phenothiazine acid halide, it is usually desirable to introduce at least one mole of the oxalyl halide per mole of the phenothiazinecarboxylate salt, and a higher ratio, such as 1.5–2 moles per mole, is usually desirable. The presence of a solvent or diluent in the reaction mixture is permissible and may be desirable; exemplary of suitable inert organic solvents and diluents are hydrocarbons such as benzene, toluene, hexane, and the like, and halogenated hydrocarbons such as ethylene dichloride, hexachloroethane and so forth. While the reaction will take place over a wide temperature range, varying from below 0° C. to about 200° C. or even higher, it is usually desirable to contact the reactants at ambient temperature. Subsequently, if desired, completion of the reaction may be facilitated by heating, suitably at moderate temperatures such as 75–125° C. In general, this reaction is suitably conducted at about atmospheric pressure, although with a volatile oxalyl halide such as oxalyl fluoride, more elevated pressures may be convenient, and to protect the oxalyl halide from contact with the external atmosphere, the reaction mixture may suitably be blanketed with an inert gas such as nitrogen. The resulting phenothiazinecarbonyl halides can be isolated by usual procedures, such as extraction, evaporation or the like.

To produce the novel esters of this invention, a phenothiazinecarbonyl halide prepared as just described is contacted with an alkanol. The useful phenothiazinecarbonyl halides include both the dinitrophenothiazinecarbonyl halide 5-oxides and the alkali metal salts of nitro-acinitrophenothiazinecarbonyl halide-5-oxides of this invention. The useful alkanols are alcohols of the formula ROH where R is saturated aliphatic hydrocarbon, such as methanol, ethanol, isopropanol, t-butanol, pentyl alcohol, hexyl alcohol, and so forth. The ratios of the reactants may vary, from a 5:1 to a 1:5 molar ratio, for example, but to promote high yields of the ester, suitably the alcohol is present in excess, such as from 1.1 to 5 moles per mole of the phenothiazine carbonyl halide. The reaction will take place over a wide range of temperatures, varying from below 0° C. to 200° C. or higher; in general, it is substantially complete in a short period of time when the reactants are heated at moderate temperatures, from 60° C. to 120° C., and brief heating at such temperatures may desirably be employed to facilitate the reaction. Solvents and diluents may be present if desired, in addition to excess alkanol; exemplary of useful inert organic liquids useful in this connection are those described above as useful in making the acid halide, for example. While pressure variation from atmospheric may be utilized to promote the reaction, for example by evacuating to draw off the hydrogen halide product of the reaction or by maintaining the reaction under autogenous pressure to prevent evaporation of the alkanol at elevated temperatures, the reaction is usually suitably carried out at atmospheric pressure. Usual means, such as extraction, evaporation, filtration, recrystallization and the like may be used to isolate the ester product.

The presently provided products are generally solid, stable materials which are useful for a wide variety of agricultural and industrial purposes. For example, the presently provided compounds may be employed as dyes. They are deeply colored materials, which may be employed to color cloth. Also, the aci-nitro salts may be used as carbon dioxide indicators; they change color on exposure to moist air containing carbon dioxide. The presently provided acids and salts are also pH indicators, distinct color changes being observed as the acid is exposed to progressively greater quantities of base, proceeding through the monosalt to the disalt, and the salts conversely exhibiting color changes on acidification, as the disalt forms the monosalt and that, the acid. The presently provided phenothiazinecarbonyl halides have a unique utility as intermediates for synthesis of the present esters, inasmuch as the usual ester synthesis method of reacting an alcohol with the acid in the presence of mineral acid is ineffective with the present phenothiazine acids. Additionally, the presently provided compounds may be employed as toxicants for species of the plant and animal kingdoms, to suppress the growth of undesired organisms such as fungi, plants, insects, bacteria and the like.

The invention is illustrated but not limited by the following examples.

Example 1

This example illustrates preparation of a dinitrophenothiazinecarboxylic acid sulfoxide.

A mixture of 500 ml. of glacial acetic acid and 12 g. of phenothiazine-1-carboxylic acid is heated on a steam bath for 2 hours, under reflux, with stirring. The reaction mixture is allowed to cool to room temperature and then chilled to 5° C. with an ice bath. Now 113 g. (1.8 mole) of concentrated nitric acid is added to the stirred, cooled suspension at a rate of 1 to 2 drops per minute over a period of 30 minutes. When the addition is complete, the ice bath is removed and the solution stirred at room temperature for 30 minutes. Finally, the reaction mixture is cautiously heated at 92° C. for one hour. The resulting reaction mixture is cooled to 35° C. and poured into 500 ml. of water, with stirring. This produces a brown precipitate which is filtered off, washed with 100 ml. of water, stirred with 135 ml. of acetone, filtered off and dried to give a yellow product which is dissolved in 5% aqueous sodium hydroxide and precipitated therefrom with dilute hydrochloric acid. A second repetition of this purification procedure yields dinitrophenothiazine-1-carboxylic acid 5-oxide as a yellow solid, M.P. 260–262° C. (decomp.) with an infrared spectrum and elemental analysis corresponding to the assigned structure of $C_{13}H_7N_3O_7S$. The spectra of the product and other evidence substantiates the assignment of the nitro substituents in this product to the 3 and 7 positions.

Example 2

This example illustrates preparation of a dinitrophenothiazinecarboxylate salt.

A portion of 3,7-dinitrophenothiazine-1-carboxylic acid, prepared as described in Example 1, is suspended in water to which an aqueous solution of sodium hydroxide is added until the amount added is equal on a molar basis to the quantity of the acid. Evaporation of the water yields a red salt melting above 320° C., having an elemental analysis corresponding to the assigned structure of sodium 3,7 - dinitrophenothiazine-1-carboxylate-5-oxide monohydrate, $C_{13}H_6N_3NaO_7S \cdot H_2O$.

Example 3

This example illustrates the preparation of an aci-nitro salt.

A portion of the dinitrophenothiazine carboxylic acid prepared as described in Example 1 is suspended in water and an aqueous solution of sodium hydroxide is added until the amount added is equal to two moles per mole of acid in the suspension. Evaporation of the water leaves a dark green salt which is disodium 7-nitro-3-aci-nitro-3H-phenothiazine-1-carboxylate-5-oxide, having an elemental analysis corresponding to the monohydrate of the assigned structure, $C_{13}H_6N_3Na_2O_7S \cdot H_2O$.

Example 4

This example illustrates preparation of another salt in accordance with this invention.

The 3,7-dinitrophenothiazine-1-carboxylic acid 5-oxide prepared as described in Example 1 is suspended, in the amount of 0.87 g., in 150 ml. of methanol. To this suspension is added 0.25 g. of triethylamine, and the mixture is let stand at room temperature for an hour. The product is an amber solution of triethylammonium 3,7-dinitrophenothiazine-1-carboxylate-5-oxide.

Example 5

This example illustrates preparation of an acid halide in accordance with this invention.

A 1.06 g. portion of sodium 3,7-dinitrophenothiazine-1-carboxylate-5-oxide monohydrate prepared as described in Example 2 suspended in 15 ml. of benzene is added 1.12 g. (0.75 ml.) of oxalyl chloride. The mixture is refluxed for 4 hours, and the dark red reaction mixture then evaporated to dryness under vacuum. The product is 3,7-dinitrophenothiazine-1-carbonyl chloride-5-oxide, of the structure

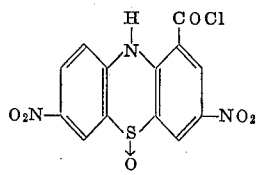

a dark-red solid, soluble in benzene.

Example 6

This example illustrates preparation of an aci-nitro phenothiazinecarbonyl halide salt.

A suspension of 0.39 g. of disodium 7-nitro-3-aci-nitro-3H - phenothiazine-1-carboxylate-5-oxide monohydrate, prepared as described in Example 3, in 7.5 ml. of dry benzene is stirred while 0.25 ml. of oxalyl chloride is added. The occurrence of reaction is evidenced by gas evolution during the addition and a subsequent hour's refluxing. The reaction product is a suspension of sodium 7-nitro-3-aci-nitro-3H-phenothiazine-1-carbonyl chloride-5-oxide, of the structure

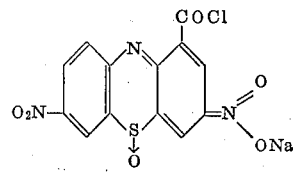

a dark-red solid, insoluble in benzene. Confirmation of the assigned structure of this acid halide is produced by reacting it with diazomethane, producing 1-[7-nitro-3-aci-nitro-3H-5-oxophenothiazinyl] diazomethyl ketone, which has an infrared spectrum including the characteristic diazoketone absorption at 2105 cm.$^{-1}$ and corresponding to its assigned structure.

Example 7

This example illustrates preparation of an ester as provided by this invention.

3,7-dinitrophenothiazine-1-carbonyl chloride-5-oxide is prepared by adding 0.38 g. (0.25 ml.) of oxalyl chloride to 0.37 g. of sodium 3,7-dinitrophenothiazine-1-carboxylate-5-oxide hydrate suspended in 5 ml. of benzene, under a nitrogen atmosphere, and refluxing for 2.5 hours, during which gas evolution is observed. To the resulting dark red solution of the acid chloride is added 5 ml. of methanol, and the resulting mixture is stirred and refluxed for a half hour. After standing overnight at room temperature, the reaction mixture is filtered and the filtrate evaporated to dryness to provide 0.23 g. of methyl 3,7-dinitrophenothiazine-1-carboxylate-5-oxide as a red solid, M.P. 226–232° C. The infrared spectrum of this product is consistent with the assigned structure.

Example 8

This example illustrates utilization of compounds as provided by this invention as dyes and as indicators.

The disodium salt of Example 3 is placed in aqueous solution and cotton cloth is immersed in the solution, withdrawn from the solution and allowed to dry. The cloth is dyed a dark green color. When the cloth is moistened, exposing it to a stream of air containing carbon dioxide produces a progressive color change to red and then to yellow.

Cloth or other absorbent material, on immersion in a solution of the acid, is dyed a yellow color. If this dyed cloth is exposed to a dilute solution of base, it is dyed red, and on exposure to a more concentrated basic solution, the color becomes deep green.

Example 9

This example illustrates utilization of compounds in accordance with this invention as an agricultural toxicant.

3,7 - dinitrophenothiazine-1-carboxylic-acid-5-oxide is placed in a medium providing support for the growth of the agricultural fungus organisms *Phytophthora infestans* (cause of tomato blight) and *Venturia inaequalis* (cause of apple scab) in a concentration of 10 parts per million, and the substrates containing this chemical are inoculated respectively with the stated fungus organisms. The inoculated plates are maintained under conditions conducive to growth of the organisms, and then observed. Growth of the organisms is completely suppressed by the presence of this chemical.

A tomato plant (Bonnie Best) having at least one mature trifoliate leaf growth is sprayed with a solution of 3,7-dinitrophenothiazine-1-carboxylic acid-5-oxide, containing a concentration of 300 parts per million of the stated chemical. Thereafter, the tomato plant is sprayed with an inoculum of *P. infestans* and maintained in a greenhouse under humid conditions conducive to growth of this fungal organism on the tomato plants. After a period of about 2 weeks, the plant is observed. The plant is healthy and substantially free of fungus infection.

When 10 parts per million of disodium 7-nitro-3-acinitro - 3H-phenothiazine-1-carboxylate-5-oxide is introduced into a substrate supporting the growth of the Venturia fungus organism, and thereafter maintained under conditions conducive to growth of this organism, growth of the fungus is substantially completely suppressed.

In further tests of activity against microbiological organisms, a concentration of one part per thousand of 3,7-dintrophenothiazine-1-carboxylic acid-5-oxide is introduced into agar substrates which are inoculated, respectively, with *S. aureus* and *S. typhosa*. The inoculated agar plates are then maintained under conditions conducive to growth of these bacteria for a period of time, after which the plates are observed for growth. Growth of the bacteria is completely suppressed by the presence of the chemical in the substrate, in both cases.

Example 10

This example illustrates use of compounds provided in accordance with this invention as insecticides.

An acetone suspension of sodium 3,7-dinitrophenothiazine-1-carboxylate-5-oxide, in a concentration of 10 grams per liter, is applied topically to adult plum circulio (*Conotrachelus nenuphar*). Better than 50% kill of these insects is produced within 48 hours by the application.

At a concentration of 10 grams per liter, applied in conjunction with a non-lethal concentration of synergists (a combination of 3 standard insecticides, of the chlorinated hydrocarbon, carbamate and organic phosphorus type, respectively), to the house fly (*Musca domestica*), disodium 7-nitro-3-aci-nitro-3H-phenothiazine-1-carboxylate-5-oxide produces close to 50% kill.

While the invention has been described with particular reference to specific preferred embodiments thereof, it will be appreciated that modifications and variations can be made without departing from the scope of the invention as disclosed herein, which is limited only as indicated in the following claims.

What is claimed is:

1. A dinitrophenothiazinecarbonyl 5-oxide compound conforming to Formula I or Formula II below comprising:

Formula I

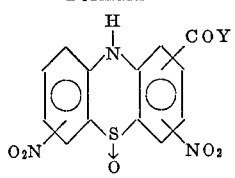

wherein each

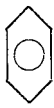

is a benzene ring with one $O_2N-$ group attached thereto; Y is a substituent selected from the class consisting of a halogen of atomic weight below 80, —OH, —OR and OX, where R is an alkyl radical of 1–6 carbon atoms and X is selected from the group consisting of sodium, potassium, lithium, an ammonium radical or an organo-ammonium radical having 1 to 3 hydrocarbon radical substituents free of aliphatic unsaturation and containing up to 10 carbon atoms; and Formula II

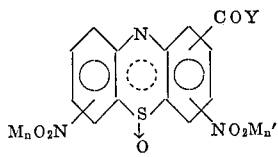

wherein each

is a 6 membered hydrocarbon aromatic ring containing conjugated unsaturation, each

having one $M_nO_2N-$ group attached thereto and wherein one of the $M_nO_2N-$ groups is an aci-nitro group; Y is a substituent selected from the class consisting of a halogen of atomic weight below 80, —OH, —OR, and OX where R is an alkyl radical of 1–6 carbon atoms and X is selected from the group consisting of sodium, potassium, lithium, an ammonium radical and an organo-ammonium radical as described above; M is selected from the group consisting of sodium, potassium and lithium; $n$ and $n'$ are integers from 0 to 1, and the summation of $n$ and $n'$ is one, said compound conforming to Formula II comprising the contributing resonance structures as set forth in Formulas III, IV, V and VI below:

Formula III

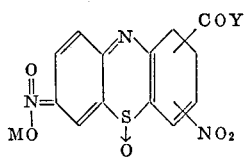

Formula IV

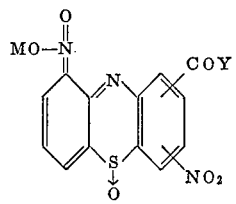

Formula V

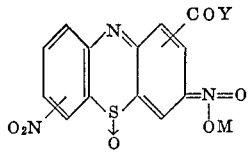

Formula VI

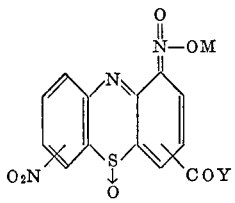

2. A compound of claim 1 of Formula I wherein said compound is a dinitrophenothiazinecarboxylic acid 5-oxide.

3. A compound of claim 1 of Formula I wherein said compound is an alkali metal dinitrophenothiazinecarboxylate 5-oxide.

4. A compound of claim 1 of Formula I wherein said compound is an organic-substituted-ammonium dinitrophenothiazinecarboxylate-5-oxide.

5. A compound of claim 1 of Formula II wherein said compound is a di-alkali metal salt of a nitro aci-nitro phenothiazinecarboxylic acid.

6. 3,7 - dinitrophenothiazine - 1 - carboxylic acid-5-oxide.

7. Sodium 3,7-dinitrophenothiazine carboxylate-5-oxide.

8. Disodium 7-nitro - 3 - aci-nitro-3H-phenothiazine-1-carboxylate-5-oxide.

9. Triethylammonium 3,7-dinitrophenothiazine-1-carboxylate-5-oxide.

10. A compound of claim 1 of Formula I wherein said compound is a dinitrophenothiazinecarbonyl halide-5-oxide.

11. 3,7 - dinitrophenothiazinecarbonyl chloride - 5-oxide.

12. A compound of claim 1 of Formula II wherein said compound is a nitro-aci-nitrophenothiazinecarbonyl halide-5-oxide alkali metal salt.

13. Sodium 7-nitro-3-aci-nitro-3H-phenothiazine-1-carbonyl chloride-5-oxide.

14. A compound of claim 1 of Formula I wherein said compound is an ester of a dinitrophenothiazinecarboxylic acid 5-oxide with an alkyl alcohol.

15. Methyl 3,7-dinitrophenothiazine-1-carboxylate-5-oxide.

No references cited.

WALTER A. MODANCE, *Primary Examiner.*
HARRY I. MOATZ, *Assistant Examiner.*